G. A. KLUGE.
DUST COLLECTOR.
APPLICATION FILED APR. 13, 1908.
1,023,082.
Patented Apr. 9, 1912.
2 SHEETS—SHEET 1.
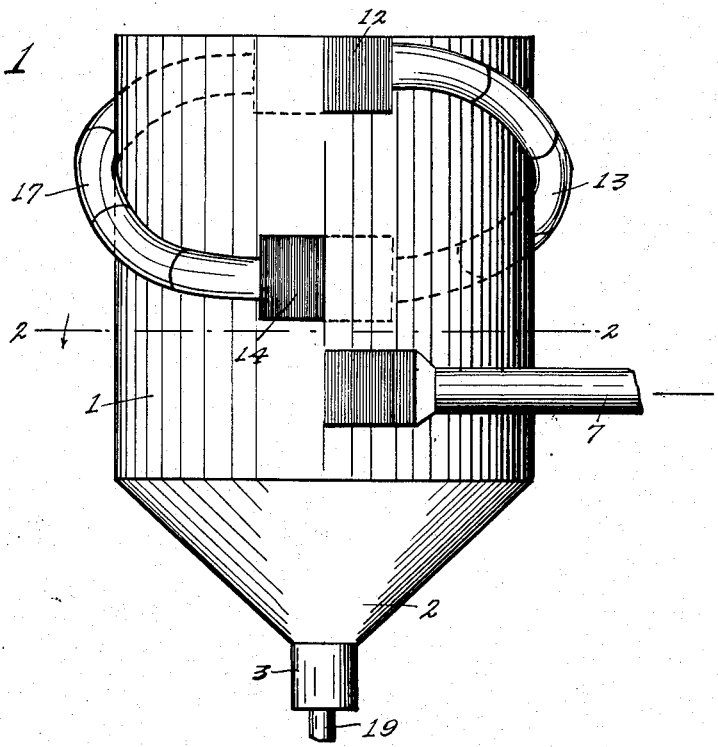
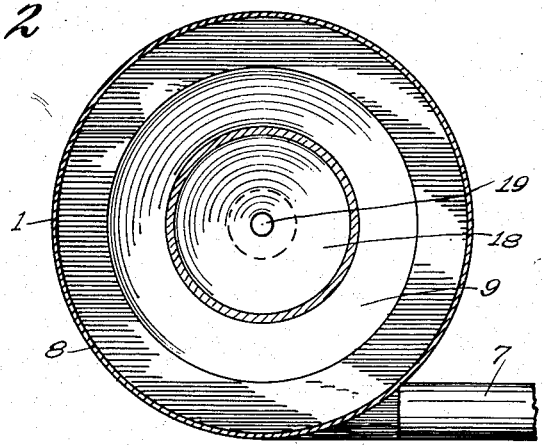
WITNESSES:
V. B. Rogers.
E. H. Lichtenberg.
INVENTOR
Gustav A. Kluge
BY
Harry Leo Dodson.
ATTORNEY

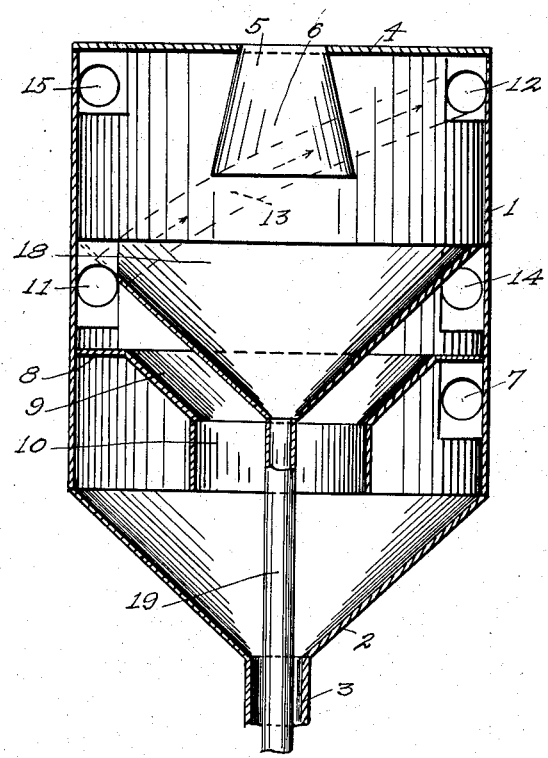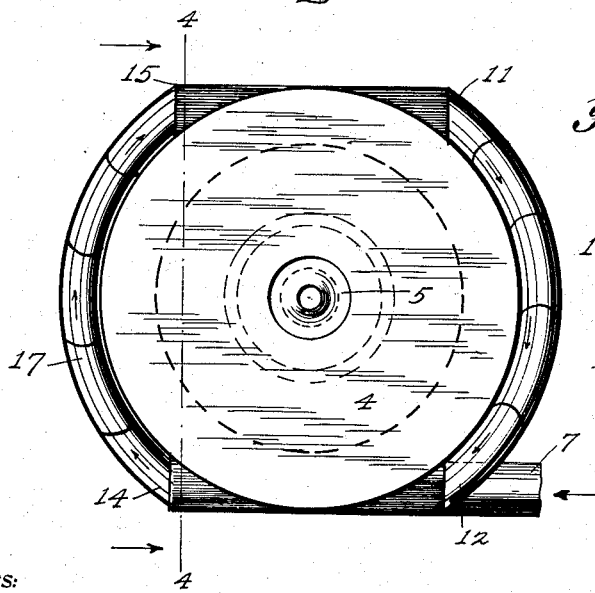

UNITED STATES PATENT OFFICE.

GUSTAV A. KLUGE, OF CHICAGO, ILLINOIS.

DUST-COLLECTOR.

1,023,082.  Specification of Letters Patent.  Patented Apr. 9, 1912.

Application filed April 13, 1908. Serial No. 426,747.

*To all whom it may concern:*

Be it known that I, GUSTAV A. KLUGE, a citizen of the United States, residing in Chicago, county of Cook, and State of Illinois, have invented a certain new and useful Improvement in Dust-Collectors, of which the following is a specification.

My invention relates to that class of dust collectors which is known as cyclone or rotary dust collectors, and has for its object to construct a collector which will collect to a higher degree than any collector now on the market. Of this type, it is a well known fact that a very considerable portion of the lighter dust particles escape through the purified air exit, and in fact, in many machines, particles of very considerable size are thrown out. In my improved dust collector it becomes impossible for any of the larger particles to be discharged and a very high degree of efficiency is attained.

My means of accomplishing the foregoing may be more readily understood by having reference to the accompanying drawings which are hereunto annexed and are a part of this specification; in which—

Figure 1, is a side elevation of the machine. Fig. 2, is a cross-section taken on the line 2—2 of Fig. 1. Fig. 3, is a top plan of the machine. Fig. 4, is a cross-section taken on the line 4—4 of Fig. 3.

I construct my collector, as shown in the drawings, with an upper cylindrical casing 1, a conical dust discharge 2, attached to the lower part of the cylindrical casing, said conical dust discharge being provided with an opening 3 for the discharge of the dust, a deck or head 4, which is provided with an axial opening 5 for the escape of the purified air, a tubular guard 6 is mounted in said opening and depends downwardly into the interior of the machine. Preferably this guard is tapered, as shown in the drawings, though it is obvious that any form of guard may be used without departing from the spirit of my invention. The cylindrical casing 1 is divided into three separating chambers hereinafter termed upper, central and lower separating chambers respectively, the lower one is provided with a tangential inlet 7, this inlet is located approximately just above the point of union of the cylindrical dust discharge 2 with the cylindrical portion 1. A downwardly depending cone 9 is mounted inside the cylindrical casing 1, it being supported by an annular plate 8 which may be secured to the casing 1 in any convenient manner. A dust discharge 10 is provided at the lower portion of the cone 9. A tangential opening 11 is provided at one side of the cylindrical casing 1 above the plate 8. A similar tangential opening 12 is provided on the same side of the machine, as better shown in the plan view, at a point just below the deck or head 4. These openings may be connected by a pipe 13, as shown in the drawings, or in any other convenient manner. Another tangential opening 14 is provided on the opposite side of the casing 1 from the opening 11, and is connected by means of suitable pipe connections 17 to a tangential opening 15 located just below the head 4 of the machine and opposite to the opening 12. A cone 18 is located within the cylindrical casing 1, its top being in a plane with the top of the tangential openings 11 and 14. It is provided with a pipe 19 which extends downwardly and out of the dust discharge 3.

The operation of the device is as follows: The dust laden air entering through the tangential inlet 7 is rotated rapidly within the lower separating chamber, the heavier particles being thrown to the periphery of the conical dust discharge 2 are carried downwardly and out through the opening 3 provided for the discharge of the dust. The comparatively purified air escapes upwardly through the opening 10 provided in the bottom part of the cone 9 into the central separating chamber 16, still continuing its gyrating motion escapes through the tangential outlets 11 and 14. It is carried upwardly by means of the pipes 13 and 17 connecting the said openings to the tangential inlets 12 and 15 into the upper separating chamber where a further separation takes place, the minute particles being carried downwardly in the cone 18 and out through the pipe 19 provided for its escape, while the purified air escapes upwardly through the taper guard 6. It will be apparent from an inspection of the drawings that an almost constant expansion is provided for the air in its escape, this operates to relieve the back pressure on the fan without sacrificing efficiency in the collection of the dust.

Although I have shown and described a specific form of apparatus it will be apparent that many changes may be made in the manufacture which will fall within the scope of my invention.

Having described my invention, what I regard as new and desire to secure by Letters Patent, is:

1. A dust collector comprising a cylindrical casing having a tangential inlet, a conical dust discharge secured to said cylindrical casing, a plurality of conical members dividing said cylindrical casing into upper, central and lower separating chambers, there being a plurality of passages connecting said chambers, formed to lead the air from one chamber to another without losing its whirling motion, a head secured to the top of said cylindrical casing, there being an axial opening in said head, for the escape of the purified air.

2. A dust collector comprising a cylindrical casing having a tangential inlet, a conical dust discharge secured to said cylindrical casing, a plurality of conical members dividing said cylindrical casing into upper, central and lower separating chambers, there being a plurality of passages connecting said chambers, formed to lead the air from one chamber to another without destroying its whirling motion, a head secured to the top of said cylindrical casing, there being an axial opening in said head for the escape of the purified air, a tubular guard mounted in said opening.

3. A dust collector comprising a cylindrical casing having a tangential inlet, a conical dust discharge secured to said cylindrical casing, a plurality of conical members dividing said cylindrical casing into upper, central and lower separating chambers, there being a plurality of passages connecting said chambers, formed to lead the air from one chamber to another without destroying its whirling motion, a head secured to the top of said cylindrical casing, there being an axial opening in said head for the escape of the purified air, a tapering tubular guard mounted in said opening.

4. A dust collector comprising a conical dust discharge, a cylindrical casing mounted thereon, said casing being divided into upper, central and lower separating chambers, there being a tangential inlet for the dust laden air, an annular plate secured to the inner walls of said cylindrical casing at a point above the tangential inlet, a truncated cone depending from said plate the lower portion thereof opening into the lower separating chamber, there being a plurality of tangential outlets from said cylindrical casing, an inverted cone secured to the side walls of the cylindrical casing forming an upper separating chamber, the top of said cone being in a plane above the tangential outlets, a pipe leading from said cone downwardly through the dust discharge, there being a plurality of tangential inlets in said upper separating chamber, suitable pipe connections connecting the tangential inlets in the upper separating chamber to the tangential outlets in the central separating chamber, a head secured to the top of said cylindrical casing, there being an axial opening therein for the escape of the purified air.

5. A dust collector comprising a conical dust discharge, a cylindrical casing mounted thereon, said casing being divided into upper, central and lower separating chambers, there being a tangential inlet for the dust laden air, an annular plate secured to the inner walls of said cylindrical casing at a point above the tangential inlet, a truncated cone depending from said plate the lower portion thereof opening into the lower separating chamber, there being a plurality of tangential outlets from said cylindrical casing, an inverted cone secured to the side walls of the cylindrical casing forming an upper separating chamber, the top of said cone being in a plane above the tangential outlets, a pipe leading from said cone downwardly through the dust discharge, there being a plurality of tangential inlets in said upper separating chamber, suitable pipe connections connecting the tangential inlets in the upper separating chamber to the tangential outlets in the central separating chamber, a head secured to the top of said cylindrical casing, there being an axial opening therein for the escape of the purified air, a tubular guard mounted in said opening.

6. A dust collector comprising a conical dust discharge, a cylindrical casing mounted thereon, said casing being divided into upper, central and lower separating chambers, there being a tangential inlet for the dust laden air, an annular plate secured to the inner walls of said cylindrical casing at a point above the tangential inlet, a truncated cone depending from said plate the lower portion thereof opening into the lower separating chamber, there being a plurality of tangential outlets from said cylindrical casing, an inverted cone secured to the side walls of the cylindrical casing forming an upper separating chamber, the top of said cone being in a plane above the tangential outlets, a pipe leading from said cone downwardly through the dust discharge, there being a plurality of tangential inlets in said upper separating chamber, suitable pipe connections connecting the tangential inlets in the upper separating chamber to the tangential outlets in the central separating chamber, a head secured to the top of said cylindrical casing, there being an axial opening therein for the escape of the purified air, a tapering tubular guard mounted in said opening.

GUSTAV A. KLUGE.

Witnesses:
   H. L. DODSON,
   N. MILLER.